June 15, 1965  S. Y. HUSNI, JR  3,188,720
METHOD OF SEALING AND JOINING AND ARTICLES MADE THEREBY
Filed June 13, 1960  2 Sheets-Sheet 1

INVENTOR.
SALEEM Y. HUSNI, JR.
BY William A. Zalesak
ATTORNEY

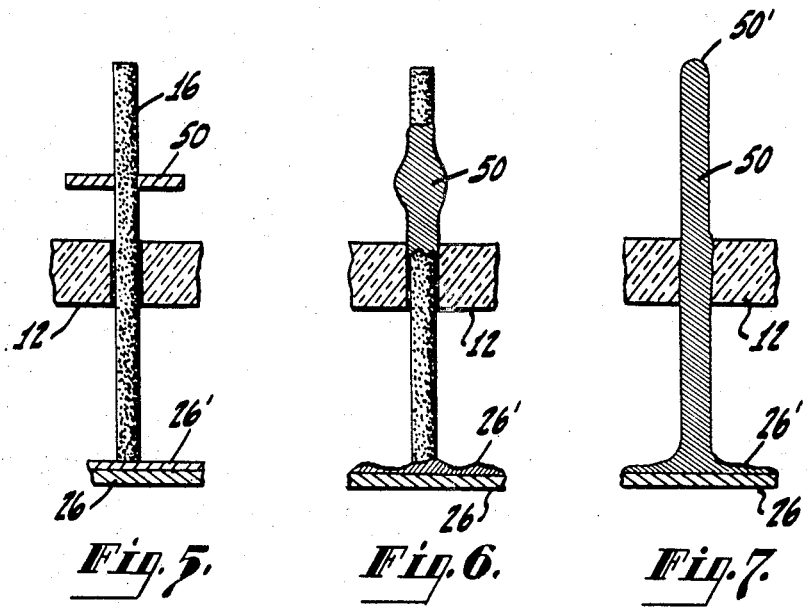
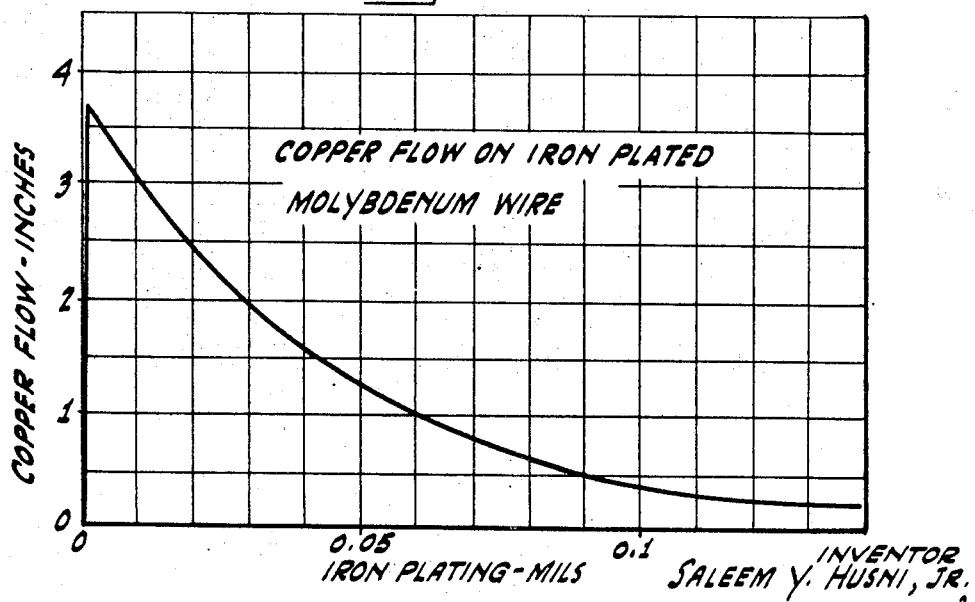

[United States Patent Office — 3,188,720 — Patented June 15, 1965]

3,188,720
METHOD OF SEALING AND JOINING AND ARTICLES MADE THEREBY

Saleem Y. Husni, Jr., Westwood, N.J., assignor to Radio Corporation of America, a corporation of Delaware
Filed June 13, 1960, Ser. No. 35,730
19 Claims. (Cl. 29—155.5)

My invention relates to braze sealing and braze joining and particularly to improvements in metal-to-ceramic vacuum tight seals and metal-to-metal joints useful in electron discharge devices, and to the method of making such seals and joints.

One form of recently designed electron discharge device in which my invention is particularly useful includes a structure comprising a flat wafer or disk header made, for example, of a ceramic material such as forsterite and having openings extending therethrough, the walls of said openings being coated with a suitable bonding material such as molybdenum. Lead-in and support conductors, preferably of molybdenum, and extending through the openings in the wafer are bonded, for example, by brazing in hydrogen, to the metal coating, providing a relatively rugged and hermetic seal between the conductors and the wafer. The lead-in conductors and supports extend into the tube envelope, which is sealed to the periphery of the wafer, and are fixed as by brazing to the tube parts or electrode mount assembly within the envelope.

It is necessary to obtain vacuum tight seals between the lead-in and support conductors and the metalized walls of the holes in the ceramic stem wafer by a brazing operation. To do this, copper washers are placed over the leads adjacent the header wafer before the brazing operation takes place. The brazing cycle is limited in time and temperature by the materials and structure of the mount assembly and the assembly jigs used. With materials normally used, brazing is preferably done at a temperature of about 1120° C. for a period of about four minutes.

In addition to forming the vacuum tight seals between the lead-ins and the header wafer during brazing, the various lead and support conductors are brazed at the same time to various tube parts, for example, the electrode supporting flanges which may be made of steel. Brazed joints must also be made, for example, between the grid which may be of molybdenum and the grid flange. Brazing is accomplished by providing copper coatings on those surfaces where a brazed joint is to be formed.

The problem has been to get the braze material, e.g., copper or copper alloy, to flow from a point of supply to the joint or seal to be made under the manufacturing condition requirements which do not tolerate excessive temperatures or too low a dew point in the hydrogen atmosphere. Previous attempts to insure that the brazing material properly wet the surfaces to be joined have not always been successful and as a result misbrazing occurs.

Particularly, it has not always been possible to obtain a consistently good vacuum tight seal between the molybdenum lead-in and support conductors and the metalized walls of the holes in the header wafer because the copper did not always flow over the conductor surfaces and properly wet the surfaces, and into the holes to completely close the gap between the conductors and the metalized walls of the holes in the wafer.

It is therefore an object of my invention to provide an improved metal-to-ceramic vacuum tight seal and improved metal-to-metal joints particularly useful in the manufacture of electron discharge devices but not limited thereto.

A further and more specific object of my invention is to provide an improved method of forming a vacuum tight metal-to-ceramic seal between molybdenum lead-in wires and support conductors and a ceramic header through which said conductors extend and to a method of forming brazed joints of metals of different compositions, one of which is molybdenum, for example, brazed joints between molybdenum conductors and other tube components of different materials such, for example, as steel supporting flanges.

Briefly, in accordance with my invention, I apply to the molybdenum member a thin coating of iron over which may be applied in some instances a coating of copper. Brazing material, e.g., copper or copper alloy material, is applied to the conductors to be brazed to provide the necessary material to fill up the space between the conductor and the metalized wall of the wafer, which wall is preferably nickel coated over the molybdenum coating, and to provide additional material to form the braze between the conductors and other parts of the tube mount assembly.

Referring to the drawings:

FIGS. 5, 6 and 7 are partial views in section of a header member, a lead-in conductor, and electrode support at different stages of brazing operations; and FIG. 8 is a graph showing the relationship of the iron coating thickness applied to a molybdenum conductor and the degree of wetting of the brazing alloy.

Figure 1:
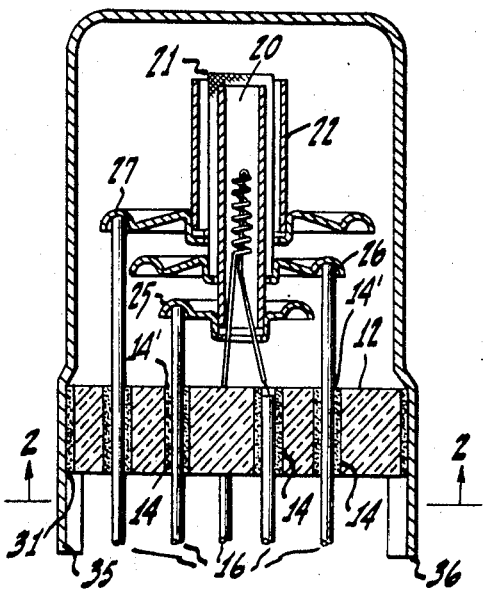
FIG. 1 is a longitudinal section of one form of electron discharge device in which my invention can be used.

One form of electron discharge device with which my invention can be used is shown in FIGURE 1. It comprises a header wafer 12 of ceramic material provided with a plurality of apertures 14 extending therethrough. The holes may be of very small diameter of the order of 17.1 to 17.5 mils after being metalized. Lead-in and support conductors 16 extend through these apertures. These conductors may have a diameter of the order of 15.4 to 15.7 mils. The conductors are sealed vacuum tight within the header member by a metalized coating 14', for example, of molybdenum. A nickel or iron coating may be applied over the coating of molybdenum to facilitate brazing. These conductors 16 are brazed to the header member during manufacture as will be described below. Supported within the envelope and in coaxial relationship are the cathode 20, control grid 21, and anode 22. These electrodes are supported on the flanges 25, 26, and 27, respectively, which are brazed to and are in electrical contact with the upper ends of the lead-in and support conductors 16. The envelope 30 encloses the electrodes and is sealed vacuum tight to the header member 12 by a metal coating 31, preferably of molybdenum. The envelope is evacuated.

Figure 2:
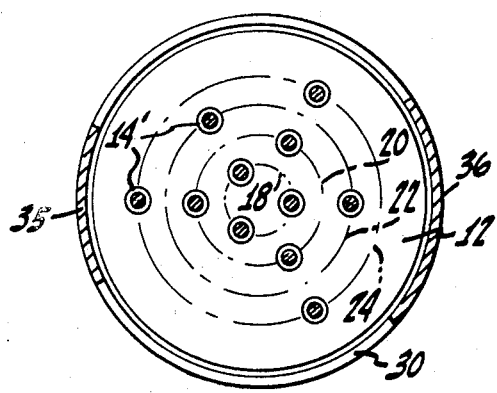
FIG. 2 is a bottom view taken tlong the line 2—2 of FIG. 1.

FIG. 2 shows the arrangement of the lead-in and support conductors extending through the base wafer 12 and lying in the concentric circles 18, 20, 22, and 24. Indexing lugs for registering the device in appropriate sockets include the arcuate shaped extensions 35 and 36 integral with the envelope.

In accordance with my invention, I apply a film or coating of iron to the surface of the molybdenum conductors. This provides a more wettable surface for the braze material.

The method of assembly involves the use of a jig adapted to receive and support individual tube parts in strain-free relation during brazing together of the parts to form the stem and electrode mount assembly. The jig with the parts loaded thereon is placed in a hydrogen furnace having a sufficiently high temperature for sealing the lead-in and support conductors to the metalized coatings in the openings through which they extend, and for brazing end portions of the lead-in and support conductors to the flange supports and the electrodes to the flange supports.

Figure 3:
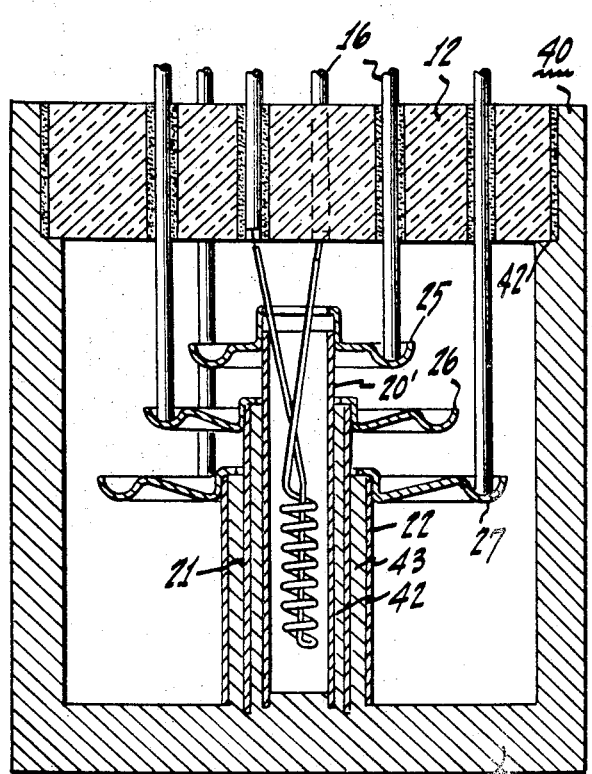
FIG. 3 is a longitudinal section of lead-in and support conductors, electrodes and ceramic wafer or header member of the device shown in FIG. 1 and mounted in a jig for brazing operations.

In assembling the header wafer 12, coated conductors 16 and electrodes prior to the enclosure within the envelope 30, the parts are all positioned within a jig 40 having a closed bottom 41 as shown in FIG. 3. The jig of suitable material such as ceramic or metal, for example, a nickel-chrome alloy, is provided with a shoulder 42. The jig is provided coaxial with its longitudinal axis with a pair of tubular members 42 and 43 which are coaxial and concentric with each other, the tubular member 43 being shorter than the sleeve 42. The various parts are assembled within the jig in the relationship shown in FIG. 3. The anode 22, grid 21 and cathode support sleeve 20' are located between the tubular members 42 and 43. The wafer 12 and conductors 16 are placed on the jig last.

Figure 4:
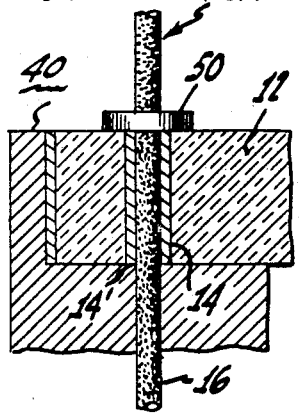
FIG. 4 is an enlarged partial section of the wafer and a conductor shown after brazing operations using my invention.

The lead-in and support conductors 16 which are preferably of molybdenum are positioned in contacting relationship with the flanges 25, 26, and 27. Copper brazing rings 50 (see FIG. 4) are disposed over and around the conductors and preferably against the header wafer 12 during brazing operations but may be spaced from the wafer.

The jig and the parts assembled therein are then placed within a brazing furnace and fired preferably in an atmosphere of hydrogen at a temperature of about 1120° C., or slightly lower, for a period of about four minutes to cause the copper to flow over the conductors and between the lead-in and support conductors and the metalized walls of the apertures to provide a vacuum tight braze. The flanges or collars 25, 26, and 27 are coated with copper brazing material to provide the brazed joints between the flanges, conductors and electrodes. The jig and assembly are then allowed to cool to a temperature of 250° C. for about two minutes. The assembly is then removed from the jig and allowed to cool to room temperature.

To provide an emitting surface on the cathode sleeve, a metal cup carrying an emitting coating is telescoped over the cathode sleeve. A shell, providing the tube envelope, of metal, for example, steel or ceramic, is then telescoped over the assembled tube structure, the tube baked out and exhausted. The rim of the shell is then brazed to the periphery of the wafer.

The steps of forming a vacuum tight seal in accordance with my invention between a lead-in conductor 16 and the ceramic wafer 12 is illustrated in FIGS. 5, 6, and 7.

The header or wafer 12 is metalized, for example, with molybdenum on the wall surface of the aperture through which the lead conductor 16 passes. This may be further coated with nickel or iron. In accordance with my invention, the molybdenum conductor is first coated with a flash of iron. This coating may be accomplished by electroplating, vapor deposition, chemical means, reduction or using pigments in a lacquer film. Each of these methods gives an adherent coating of iron on molybdenum and enhances the flow of the braze material. The brazing washer 50 which is of copper or copper alloy is applied to lead 16 by, for example, automatic equipment or manually, friction holding the washer in place. One end of the conductor 16 may be in contact with the copper-plated support flange, for example, flange 26 which may be of steel or molybdenum having a copper coating 26' thereon. The assembly is then subjected to brazing temperatures of between 1100° to 1125° C. for a period of about 4 minutes. FIG. 6 shows an intermediate step in providing the vacuum tight seal to the ceramic and the brazed joint between the conductor and the flange, and FIG. 7 shows the completed brazed assembly. I have found that the copper not only wets readily but provides an excellent vacuum tight seal between the conductor and the ceramic member as well as providing a good brazed joint to the electrode supporting flange. I have also found that, due to wettability caused by the iron flash, the copper provides highly desired radii at the cut ends of the conductors and leads eliminating the sharp edges caused by severing conductors during forming thereof. The uniform coating of the parts with brazed material decreases electrical contact resistance and enhances the aesthetic appearance of the external parts.

I have found that leads of molybdenum wire coated with iron have an improved wettability over leads of clean molybdenum or over copper-plated molybdenum leads, when the stem assemblies are brazed in hydrogen at around 1120° C. In general, the copper flows freely over the entire lead surface both up and down with respect to the position of the brazing ring.

I have found that it is possible to locate the braze material remote from the joints to be made and that, nevertheless, the molten material is driven during brazing into and around the joints with uniform distribution of the surfaces involved. Good brazes under wide operating conditions in addition to low cost of electroplating iron on the molybdenum make the iron coated molybdenum particularly suitable for the purposes described above. The copper spreads uniformly over metal surfaces and when it reaches the joint, a capillary action becomes a driving force carrying the molten copper from the supply point to the joint by way of the uniform molten channel. If this molten channel were not sustained by wettability of copper to the surfaces, a break would occur and the source of supply to the joint would be cut off regardless of high capillary driving forces. While I have found that other materials such as cobalt and palladium produce nearly the same action as iron, the spread of uniformity of the braze material seems to be best when iron is used. Furthermore, cobalt and palladium are more expensive than iron.

The thickness of the iron flash or iron coating has a definite effect upon the flow of the copper along the surface of the molybdenum. I have found that an optimum occurs when the coating is only a few atoms thick, although successful brazes have been made with the coatings as thick as .1 mil.

As shown in FIG. 8, the amount of flow of copper brazing material or copper along the surface of a molybdenum wire is greatest when the iron coating is a few atoms thick, the flow dropping rapidly when the thickness of the iron coating increases from a few atoms thick to .03 mil in almost a straight line relationship but tailing off more and more as the thickness of the coating increases until a thickness of 0.1 mil is reached, at which point the curve showing the amount of flow changes very little. This indicates that applying a coating thickness of more than 0.1 mil serves no useful purpose. The curve is the result of tests made with various thicknesses of iron flash or coating on a 15 to 16 mil molybdenum wire subjected to a brazing temperature of 1125° C. for a period of 4 minutes. Temperatures at the melting point of copper, that is, 1083° C., require more time for making the braze, and hence are not desirable, since, for efficient fabrication, as short a time as possible for brazing operations is desired. On the other hand, if temperatures are raised above 1125° C., the viscosity is lowered and flow rate increased. While this increased flow is not objectionable, higher temperatures result in copper on other elements, for example, on the iron or steel flanges, to alloy therewith instead of entering into brazing operations. This is not desired.

My invention also has applicability to the formation of grids of the wound type utilizing either molybdenum side rods or molybdenum lateral wires. For example, in utilizing molybdenum side rods, I have found that a good brazed grid can be formed utilizing lateral wires either of molybdenum or of an iron alloy by first plating the side rods with a flash or iron and then coating or plating copper thereover. After the grid has been wound on the mandrel, the mandrel with the wound grid may be subjected to alloying temperatures which provide good brazes at the points of contact between the lateral wires and side rods. Lateral wires of molybdenum may be coated with iron and brazed to copper or copper coated side rods with success. Further, the supporting flanges may be of copper coated iron or steel or of molybdenum coated with iron and copper which is readily brazed to the grid of molybdenum, iron flashed, when subjected to brazing temperatures.

In addition to providing a reliable and low-cost method of obtaining a surface of good wettability, the iron coated molybdenum leads can also be readily applied to automatic assembly techniques in which the wire is fed from spools into an assembly mechanism.

The iron coated molybdenum lead conductors have a relatively smooth surface and do not exhibit any tendency to "hang up" in the brazing operation; that is, when the parts reach brazing temperature and the copper brazing metal flows, the lead conductors fall freely in the holes and continue to contact the electrode flanges in the mount assembly.

What is claimed is:

1. The method of forming a brazed connection between a conductor of molybdenum and a member having a metal surface of some other material comprising the steps of coating said conductor with iron to the thickness of a few atoms to 0.1 mil, bringing said conductor and said member into brazing relationship, applying a brazing material containing copper to said coated conductor and subjecting said member, said coated conductor and said brazing material to a brazing temperature for sufficient time to cause said copper to melt and flow over said conductor and between said conductor and member to braze said conductor to said member.

2. The method of braze joining and braze sealing a conducting part of molybdenum to a metal part and to a ceramic member having an aperture therein for receiving said conducting part, said aperture having a metalized coating of molybdenum comprising the steps of applying a coating of iron to said conducting part of molybdenum to a thickness of from a few atoms to 0.1 mil thick, inserting said conducting part within said aperture and bringing said conducting part and said metal part in contact, applying brazing material to said conducting part of molybdenum and subjecting said ceramic member, said conducting part, said metal part and said brazing material to a temperature of approximately 1120° C. for sufficient time to cause said brazing material to melt and flow over said conducting part and to fill the space between said conducting part and metalized wall of said aperture, to braze said conducting part to said ceramic member with a vacuum tight seal and to braze said conducting part to said metal part.

3. The method of forming a vacuum tight seal between a conductor of molybdenum and a ceramic member having an aperture for receiving said conductor therein, comprising metalizing the walls of said aperture, coating the conductor with iron to the thickness of a few atoms to 0.1 mil, inserting said coated conductor within said aperture, applying brazing material having copper therein to said conductor and subjecting said ceramic member and said coated conductor to a brazing temperature for sufficient time to cause said brazing material to melt and flow over said conductor and fill the space between said conductor and the metalized wall of said aperture to braze said conductor to said ceramic member with a vacuum tight seal.

4. The method of forming a vacuum tight seal between a conductor of molybdenum and a ceramic member having an aperture for receiving said conductor therein, comprising metalizing the walls of said aperture, coating the conductor with iron to a thickness of a few atoms, inserting said coated conductor within said aperture, applying brazing material to said conductor and subjecting said ceramic member and said coated conductor to a brazing temperature for sufficient time to cause said brazing material to melt and flow over said conductor and fill the space between said conductor and the metalized wall of said aperture to braze said conductor to said ceramic member with a vacuum tight seal.

5. A conductor adapted to be sealed through a ceramic member having a metalized surface to which said surface the conductor is to be sealed by a copper braze, said conductor comprising a molybdenum core having a coating of iron thereon, said coating of iron having a thickness of from a few atom layers to 0.1 mil in thickness.

6. A conductor adapted to be sealed through a ceramic member having a metalized surface to which said surface the conductor is to be sealed by a copper braze, said conductor comprising a molybdenum core having an outer coating of iron flashed thereon, said coating of iron being adapted to be sealed directly to said metalized surface.

7. A conductor adapted to be sealed through a ceramic member having metalized surface to which said surface the conductor is to be sealed by a copper braze, said conductor comprising a molybdenum core having successive coatings of iron flashed thereon and copper thereon.

8. The method of forming a vacuum tight seal between a conductor of molybdenum and a ceramic member having an aperture for receiving said conductor therein, comprising metalizing the walls of said aperture to provide a coating of molybdenum, coating the conductor successively with a flash of iron and a coating of copper, then inserting said coated conductor within said aperture, and subjecting said ceramic member and said coated conductor to a brazing tempreature for sufficient time to cause said copper to melt and flow over and fill the space between said conductor and the metalized wall of said aperture to braze said conductor to said ceramic member with a vacuum tight seal.

9. The method of fabricating a tube electrode mount assembly comprising a ceramic wafer having apertures therein, molybdenum lead and support conductors extending through said apertures and flanges supported on said conductors and in turn supporting electrode members, some of said electrode members being of molybdenum, comprising the steps of coating the molybdenum conductors and members with a flash of iron, assembling said wafer, conductors, flanges and electrode members in contacting relationship, applying a brazing material containing copper to said conductors, subjecting said assembly to a brazing temperature sufficient to cause said brazing material to melt and flow over said conductors to fill said apertures and to provide brazed joints between said conductors, said flanges and said electrode members.

10. The method of fabricating a tube electrode mount assembly comprising a ceramic wafer having apertures therein, molybdenum lead and support conductors extending through said apertures and flanges supported on said conductors and in turn supporting electrode members, said flanges having a copper surface thereon, comprising the steps of coating the mloybdenum conductors with a flash of iron, assembling said wafer, conductors, flanges and electrode members in contacting relationship, applying a brazing material containing copper to said conductors, subjecting said assembly to a brazing temperature sufficient to cause said brazing material to melt and flow over said conductors to fill said apertures and to provide brazed joints between said conductors, said flanges and said electrode members.

11. The method of forming a grid assembly comprising side rods and a lateral wire, one of said side rods and said lateral wire comprising molybdenum, the steps of applying an iron flash coating to said molybdenum, applying a copper coating over said iron coating, then assembling said side rods and lateral wire on a mandrel, subjecting said mandrel, side rods and lateral wire to a temperature sufficient to cause said copper to flow between the contacting surfaces of said side rods and said lateral wire to braze said side rods and lateral wire together.

12. The method of forming a grid assembly comprising side rods and a lateral wire, said side rods comprising molybdenum, the steps of applying an iron flash coating to said molybdenum, applying a copper coating over said iron coating, then assembling said side rods and lateral wire on a mandrel, subjecting said mandrel, side rods and lateral wire to a temperature sufficient to cause said copper to flow between the contacting surfaces of said side rods and said lateral wire to braze said side rods and lateral wire together.

13. The method of forming a grid assembly comprising side rods and a lateral wire, said side rods having a copper surface and said lateral wire comprising molybdenum, the steps of applying an iron flash coating to said molybdenum, then assembling said side rods and lateral wire on a mandrel, and then without further treatment of said lateral wire subjecting said mandrel, side rods and lateral wire to a temperature sufficient to cause said copper to flow between the contacting surfaces of said side rods and said lateral wire to braze said side rods and lateral wire together.

14. A conductor adapted to be brazed to another member having a metal surface by means of brazing material containing copper, said conductor comprising a molybdenum core having successive coatings of iron flashed thereon and copper thereon.

15. A conductor adapted to be brazed to another member having a metal surface by means of brazing material containing copper, said conductor comprising a molybdenum core having successive coatings of iron and copper thereon, the iron coating having a thickness of from a few atoms to 0.1 mil.

16. A grid assembly comprising, side rods and a lateral wire, said side rods comprising molybdenum having successive coatings of iron flashed thereon and copper on said molybdenum.

17. A grid assembly comprising side rods and a lateral wire, said lateral wire comprising molybdenum and having a coating of iron flashed thereon thereover, said side rods having a copper surface.

18. The method of forming a brazed connection between a conductor of molybdenum and a member having a metal surface of some other material comprising the steps of coating said conductor with iron to the thickness of few atoms to .1 mil, bringing the said conductor and said member into brazing relationship, applying a brazing material containing copper to one of said conductor and said member, and subjecting said member, said coated conductor, and said brazing material to a brazing temperature for a sufficient time to cause said brazing material to melt and flow over said conductor and between said conductor and member to braze said conductor to said member.

19. The method of braze joining and braze sealing a conducting part of molybdenum to a metal part and to a ceramic member having an aperture therein for receiving said conducting part, said aperture having a metalized coating of molybdenum, said method comprising the steps of applying a coating of iron having a thickness of a few atoms to 0.1 mil to said part of molybdenum, inserting said conducting part within said aperture and bringing said conducting part and said metal part in contact, applying brazing material containing copper to one of said conducting part of molybdenum and said metal part and subjecting said ceramic member, said conducting part, said metal part, and said brazing material to a brazing temperature for a sufficient time to cause said brazing material to melt and flow over said conductor and fill the space between said conductor and metalized wall of said aperture to braze said conductor to said ceramic member with a vacuum-tight seal and to braze said conducting part of molybdenum to said metal part.

References Cited by the Examiner

UNITED STATES PATENTS

| | | | |
|---|---|---|---|
| 1,263,656 | 4/18 | Farrenwald | 29—492 X |
| 1,804,237 | 5/31 | Steenstrup | 29—492 X |
| 1,948,485 | 2/34 | Anslem | 29—198 X |
| 2,282,097 | 5/42 | Taylor | 29—198 X |
| 2,549,551 | 4/51 | Walsh | 29—25.14 X |
| 2,682,101 | 6/54 | Whitfield et al. | 29—199 X |
| 2,697,130 | 12/54 | Korbelak | 29—198 X |
| 2,790,926 | 4/57 | Morton | 29—25.14 X |
| 2,834,101 | 5/58 | Boam et al. | 29—492 X |
| 3,004,185 | 10/61 | Rose. | |
| 3,062,981 | 11/62 | Stoeckert et al. | 29—483 X |
| 3,089,234 | 5/63 | Deevy | 29—473.1 |

FOREIGN PATENTS

| | | |
|---|---|---|
| 500,750 | 3/54 | Canada |
| 556,614 | 4/58 | Canada |

OTHER REFERENCES

RCA TN No. 116, published by RCA Laboratories, Princeton, N.J.

JOHN F. CAMPBELL, *Primary Examiner.*

WHITMORE A. WILTZ, *Examiner.*